US011042039B1

(12) United States Patent
Trail

(10) Patent No.: US 11,042,039 B1
(45) Date of Patent: Jun. 22, 2021

(54) VARIFOCAL DISPLAY WITH ACTUATED REFLECTORS

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 725 days.

(21) Appl. No.: 15/783,745

(22) Filed: Oct. 13, 2017

Related U.S. Application Data

(60) Provisional application No. 62/437,012, filed on Dec. 20, 2016.

(51) Int. Cl.
H04N 13/332 (2018.01)
G06T 7/70 (2017.01)
G02B 27/01 (2006.01)
G02B 27/00 (2006.01)
G02B 26/00 (2006.01)
G02B 27/28 (2006.01)
G06F 3/01 (2006.01)

(52) U.S. Cl.
CPC ......... G02B 27/0179 (2013.01); G02B 26/00 (2013.01); G02B 27/0093 (2013.01); G02B 27/0172 (2013.01); G02B 27/283 (2013.01); G02B 27/286 (2013.01); G06F 3/013 (2013.01); G02B 2027/0185 (2013.01); G02B 2027/0187 (2013.01)

(58) Field of Classification Search
CPC ......... G06T 19/006; G06T 7/70; G06T 19/00; G06F 3/012; G06F 3/013; G06F 19/006; G02B 27/017; G02B 2027/014; G02B 2027/0138; G02B 2027/0178; G02B 27/0179; G02B 26/00; G02B 27/0093; G02B 27/0172; G02B 27/283; G02B 27/286; G02B 2027/0185; G02B 2027/0187; H04N 13/344; H04N 13/156; H04N 13/332
See application file for complete search history.

(56) References Cited

U.S. PATENT DOCUMENTS 9,557,568 B1 1/2017 Ouderkirk et al.
9,921,413 B2 3/2018 Xu
(Continued)

Primary Examiner — Patrick E Demosky
(74) Attorney, Agent, or Firm — Fenwick & West LLP

(57) ABSTRACT

A head-mounted-display includes an electronic display emitting image light and a varifocal block receiving the image light and outputting the image light in at least one of the focal planes of the varifocal block. The varifocal block includes a back optical element, a front optical element, and an actuator assembly coupled to the back and front optical element. The front optical element is positioned closer to an exit pupil than the back optical element, and separated from the back optical element by an adjustable distance, the magnitude of which determines in which of the focal planes the image light is presented. The actuator assembly simultaneously adjusts positions of the back optical element and the front optical element to vary the adjustable distance between the back optical element and the front optical element in accordance with an estimated vergence depth of the user.

10 Claims, 7 Drawing Sheets

(56) References Cited

U.S. PATENT DOCUMENTS

| | | | |
|---|---|---|---|
| 2016/0116745 A1* | 4/2016 | Osterhout | G02B 27/0172 |
| | | | 359/614 |
| 2017/0161951 A1* | 6/2017 | Fix | G06T 5/00 |
| 2017/0296421 A1* | 10/2017 | Travers | A61H 5/00 |
| 2017/0358136 A1* | 12/2017 | Collier | G06F 1/163 |
| 2018/0003862 A1* | 1/2018 | Benitez | H04N 13/341 |

* cited by examiner (Real World)

(3D Display)

VARIFOCAL DISPLAY WITH ACTUATED REFLECTORS

CROSS REFERENCE TO RELATED APPLICATIONS

This application claims the benefit of U.S. Provisional Application No. 62/437,012, filed Dec. 20, 2016, which is incorporated by reference in its entirety.

BACKGROUND

The present disclosure generally relates to enhancing images from electronic displays, and specifically to adjusting the presented focus state of optics to enhance the images.

A head-mounted display (HMD) presents a viewable media to a user. The user looking at the viewable media having binocular vision requires many cues to be correctly mimicked in a VR/AR/MR experience. Two cues of immediate importance that are strongly tied together due to physiology are vergence and accommodation. The first response, also known as "vergence," relates to the user converging the two eyes so that both are directed at a point of interest. The second response, also known as "accommodation," relates to the user focusing a lens within the eyes of the user to sharpen an image corresponding to the viewable media on a retina. As a result, if the brain and the eyes mis-converge, the user of the HMD setup can see double images; if the brain and the eyes mis-accommodate, the user of the HMD setup will see blurry images. The user experiencing only vergence or accommodation and not both will eventually experience some degree of fatigue and nausea, which is undesirable for the performance of the HMD.

SUMMARY

Embodiments relate to a head-mounted display (HMD) that includes an electronic display emitting image light and a varifocal block receiving the image light and outputting the image light in at least one of the focal planes of the varifocal block. The varifocal block includes a back optical element, a front optical element, and an actuator assembly coupled to the first and front optical element. The front optical element is positioned closer to an exit pupil than the back optical element, and separated from the back optical element by an adjustable distance, the magnitude of which determines in which of the focal planes the image light is presented. The actuator assembly simultaneously adjusts positions of at least one of the back optical element and the front optical element to vary the adjustable distance between the back optical element and the front optical element in accordance with an estimated vergence depth of the user.

In some configurations, the back optical element includes a reflective polarizer surface that reflects linearly polarized light having a first polarization, and transmit linearly polarized light having a second polarization that is orthogonal to the first polarization, and a waveplate surface that shifts a polarization state of light received from the reflective polarizer surface. The waveplate surface may include a polarization axis and shifts the polarization axis to a target angle relative to the linearly polarized light such that the waveplate surface converts the linearly polarized light into a circularly polarized light. The front optical element may include a mirrored surface that reflects light of a first polarization and transmits light of a second polarization that is orthogonal to the first polarization; and a waveplate surface that shifts a polarization state of light received from the mirrored surface.

Embodiments also related to a method of determining a position and an orientation of a head-mounted display (HMD) worn by a user, determining a portion of a virtual scene based on the determined position and orientation of the HMD, displaying the determined portion of the virtual scene being on an electronic display of the HMD, determining an eye position for each eye of the user using an eye tracking module, determining a vergence depth based on an estimated intersection of gaze lines, and adjusting an optical power or focus of the HMD based on the determined vergence depth by controlling a distance between the front optical element and the back optical element in the varifocal block.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A head mounted display (HMD) includes a varifocal system also referred to as a "varifocal block". The HMD presents content via an electronic display to a user at a specific focal distance. The varifocal block adjusts the focal distance in accordance with instructions from the HMD to, e.g., mitigate vergence-accommodation conflict (VAC) of the wearing user. The focal distance is adjusted by altering the distance between two optical elements in the varifocal block; specifically, to either individually or simultaneously move a front optical element and a back optical element either closer to each other or farther away from each other.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes change angle to view a new object at a distance different from an object they had been looking at, the eyes automatically change focus (by changing their shape) to provide accommodation at the new distance or vergence depth of the new object.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a a head-mounted display (HMD) connected to a host computer system, a standalone HMD, a mobile device or computing system, or any other hardware platform capable of providing artificial reality content to one or more viewers.

Figure 1A:
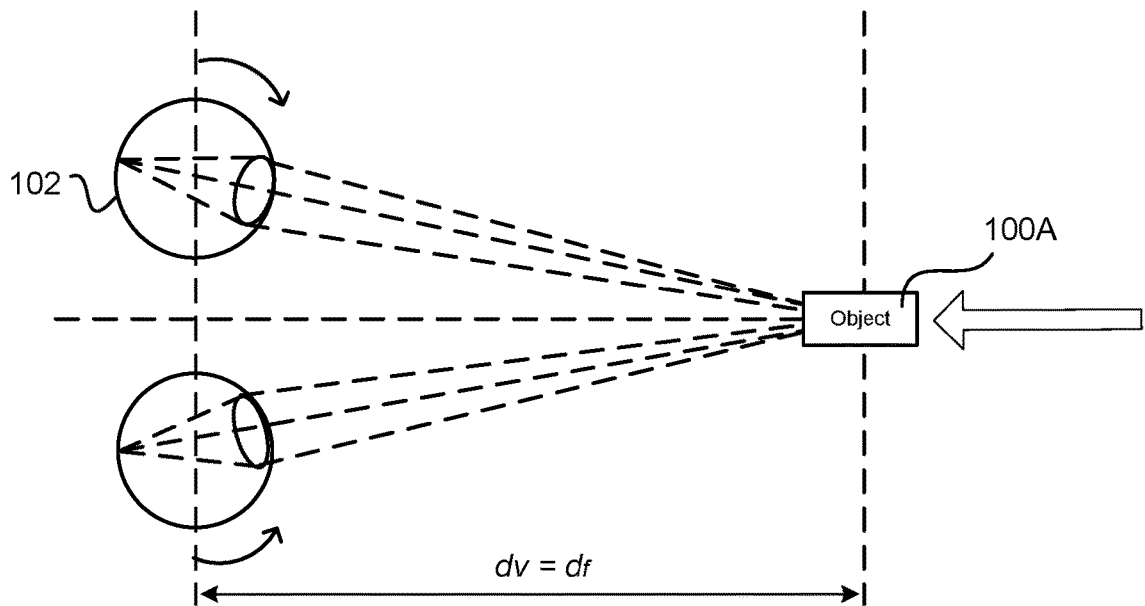
FIG. 1A shows the relationship between vergence and eye focal length in the real world.

FIG. 1A shows the relationship between vergence and eye focal length (accommodation) in the real world. In the example of FIG. 1A, the user is looking at a real object 100A (i.e., the user's eyes are verged on the real object 100A and gaze lines from the user's eyes intersect at real object 100A.). As the real object 100A is moved closer to the user, as indicated by the arrow in FIG. 1A, each eye 102 rotates inward (i.e., convergence) to stay verged on the real object 100A. As the real object 100A gets closer, the eye 102 has to "accommodate" for the closer distance by changing its shape to reduce the power or focal length. Thus, under normal conditions in the real world, the vergence depth ($d_v$) equals the focal length ($d_f$).

Figure 1B:
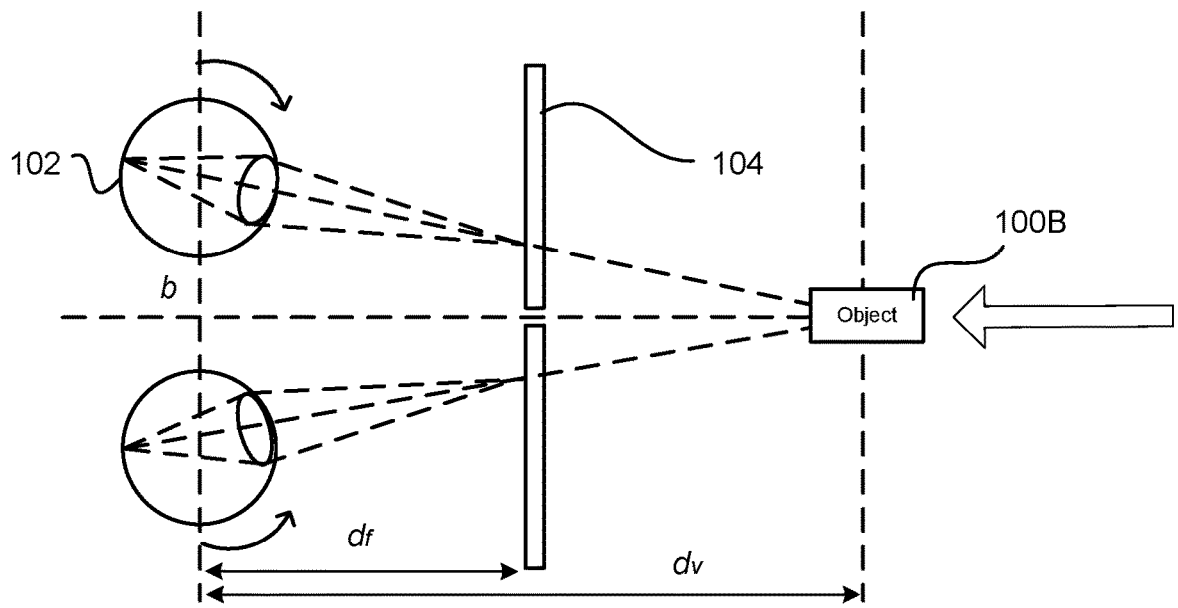
FIG. 1B shows the conflict between vergence and eye focal length in a three-dimensional display screen.

FIG. 1B shows an example conflict between vergence and accommodation that can occur with some three-dimensional displays. In this example, a user is looking at a virtual object 100B displayed on a 3D electronic display 104; however, the user's eyes are verged on and gaze lines from the user's eyes intersect at the virtual object 100B, which is a greater distance from the user's eyes than the 3D electronic display 104. As the virtual object 100B is rendered on the 3D electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, the eye 102 maintains accommodation at a distance associated with the 3D electronic display 104. Thus, the vergence depth (dy) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality systems.

Figure 2:
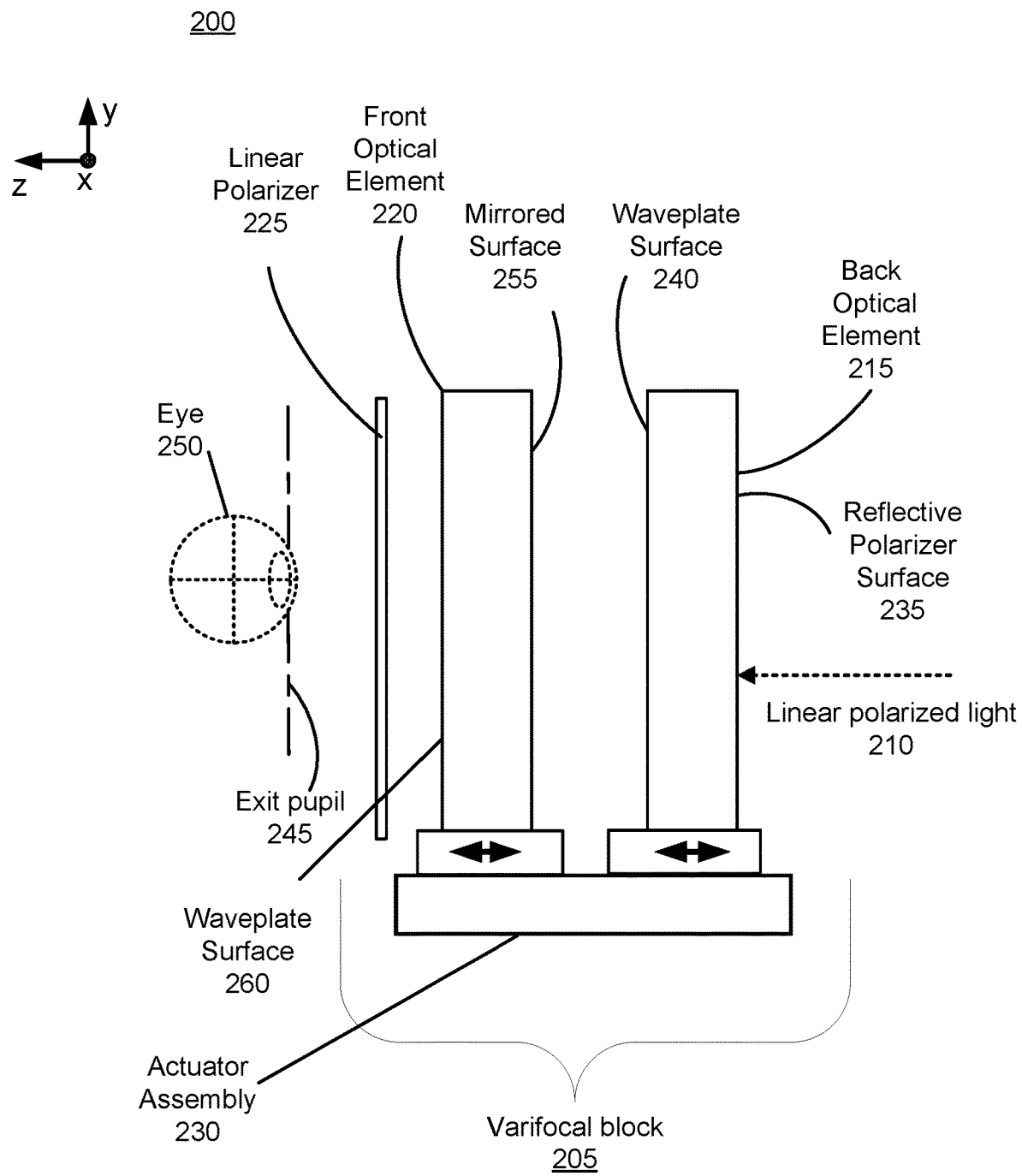
FIG. 2 is a cross section of an actuated varifocal block, in accordance with one embodiment.

FIG. 2 is a cross section 200 of a varifocal block 205, in accordance with one embodiment. The varifocal block 205 receives linearly polarized light 210. In some embodiments, the linearly polarized light 210 is output by an electronic display. The varifocal block 205 includes a back optical element 215, a front optical element 220, a linear polarizer 225, and an actuator assembly 230. In alternative configurations, different and/or additional components may be included in the varifocal block 205, or one or more surfaces of the front optical element 220 and/or the back optical element 215 may be coated with different optical coatings. Similarly, functionality of one or more of the components can be distributed among the components in a different manner than is described here.

The back optical element 215 is an optical component that receives the linearly polarized light 210. The back optical element 215 includes a reflective polarizer surface 235 and a waveplate surface 240.

The reflective polarizer surface 235 is an optical element configured to reflect linearly polarized light having a first polarization (e.g., in a blocking direction), and transmit linearly polarized light having a second polarization (e.g., in a transmission direction) that is orthogonal to the first polarization.

The waveplate surface 240 is a quarter-waveplate that shifts a polarization state of the received light from the reflective polarizer surface 235. The waveplate surface 240 includes a polarization axis and shifts the polarization axis 45 degrees relative to incident linearly polarized light such that the waveplate surface 240 converts linearly polarized light into circularly polarized light. Likewise, the waveplate surface 240 can convert circularly polarized light to linearly polarized light. The waveplate surface 240 may be composed of, e.g., a birefringent material (e.g., quartz), organic material sheets, optical plastics, liquid crystal, or some combination thereof.

The front optical element 220 is an optical component that provides image light to an exit pupil 245. The front optical element 220 is positioned closer to the user's eye 250. The front optical element 220 includes a mirrored surface 255 and a waveplate surface 260.

The mirrored surface 255 is a reflective partial mirror configured to reflect received light of a first polarization and transmit received light of a second polarization that is orthogonal to the first polarization. In some embodiments, the mirrored surface 255 is configured to transmit 50% of incident light and reflect 50% of incident light, independent of polarization state.

The waveplate surface 260 is substantially similar to the waveplate surface 240. The waveplate surface 260 shifts the polarization state of received light from the mirrored surface 255.

The linear polarizer 225 is an optical element configured to block linearly polarized light having a first polarization (e.g., referred to as a blocking direction). The linear polarizer transmits linearly polarized light having a second polarization (e.g., referred to as a transmission direction) that is orthogonal to the first polarization.

A plurality of surfaces of the front optical element 220 and the back optical element 215 may be shaped to be spherically concave (e.g., a portion of a sphere), spherically convex, a rotationally symmetric sphere, a freeform shape, or some other shape that mitigates optical aberrations. In some embodiments, a plurality of the optical elements within the varifocal block 205 may have a plurality of coatings, such as anti-reflective coatings, to reduce ghost images and enhance contrast. In some embodiments, there may be additional surfaces within the back optical element 215 and/or the front optical element 220 to provide for optical power needed to focus and correct aberrations, allowing the aforementioned optical surfaces to be encapsulated, combined, or otherwise put on a surface that best function for their purpose, such as flat or weakly spherical surfaces.

The actuator assembly 230 is a mechanical component that performs a movement of optical components (e.g. reflectors, lens, wave plates, etc.). The actuator assembly 230 positions the front optical element 220 and the back optical element 215 in accordance with varifocal instructions. Varifocal instructions are instructions that describe positional information for the front optical element 220 and the back optical element 215. In some embodiments, varifocal instructions may include, e.g., a distance (in z) between the front optical element 220 and the back optical element 215, an amount of pitch (i.e., rotation about x) for the front optical element 220 and/or the back optical element 215, an amount of yaw (i.e., rotation about y) for the front optical element 220 and/or the back optical element 215, an amount of roll (i.e., rotation about z) for the front optical element 220 and/or the back optical element 215, or some combination thereof.

In some embodiments, the actuator assembly 230 includes one or more motors that perform the movement of at least one of the front optical element 220 and the back optical element 215 in accordance with the varifocal instructions. The actuator assembly 230 can be configured to simultaneously move the front optical element 220 and the back optical element 215 either closer to each other or farther away from each other parallel to the z-axis. For example, the actuator assembly 230 may drive a single screw, and the front optical element 220 and the back optical element 215 may each be coupled to the single screw (e.g., via respective optical mounts). The threading on the screw may be such that if the screw is rotated one direction (e.g., clockwise) the front optical element 220 and the back optical element 215 move closer to each other. And if the screw is rotated an opposite direction (e.g., anti-clockwise) the front optical element 220 and the back optical element 215 move away from each other. In some configurations, the actuator assembly 230 includes servomotors that move along any arbitrary direction and/or rotation with a desired range of velocities and acceleration. For example, the actuator assembly 230 includes a motor and servo loop that can cover up to 100 millimeters-per-second peak velocity and up to 1,000 millimeters-per-second-squared acceleration.

The varifocal block 205 directs the light from, e.g., an electronic display, to the user's eyes. In some embodiments, the varifocal block 205 is part of a HMD. For purposes of illustration, FIG. 2 shows the cross section 200 of the varifocal block 205 associated with a single eye 250, but another varifocal display assembly, separate from the varifocal block 205 shown in FIG. 2, can provide altered image light to another eye of the user. Some embodiments of the varifocal block 205 have different components than those described here. Similarly, in some cases, functions can be distributed among the components in a different manner than is described here.

Figure 3:
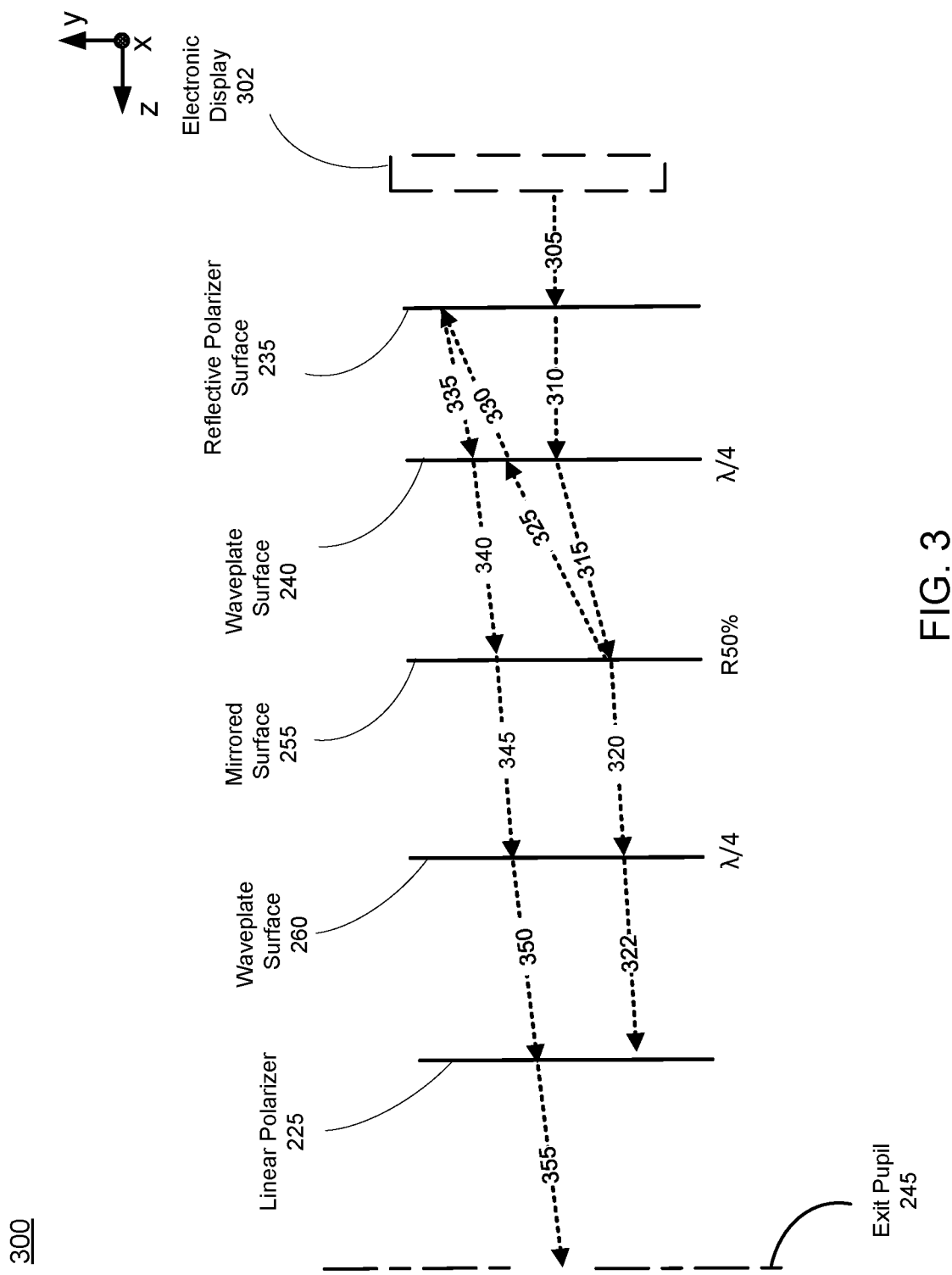
FIG. 3 shows an example of light transmission and reflection happening in the actuated varifocal block shown in FIG. 2, in accordance with one embodiment.

FIG. 3 shows an example 300 of light transmission and reflection within the varifocal block 205 shown in FIG. 2, in accordance with one embodiment.

In the example 300, light 305 from an electronic display 302 (e.g., as described below with reference to FIGS. 5A and 5B) is linearly polarized. Note, in alternate embodiments, light from the electronic display 320 may be unpolarized and is polarized upon interaction with the reflective polarizer surface 235, or there is an additional linear polarizer that linear polarizes the unpolarized light to form the linearly polarized light 305.

The linearly polarized light 305 is incident on the reflective polarizer surface 235, which reflects light that is polarized in a blocking direction (e.g., x direction) and transmits light that is polarized in an orthogonal direction (e.g., y direction) as light 310. In some embodiments, the reflective polarizer surface 235 is oriented such that its transmission direction is aligned with the polarization of the linear polarized light 305.

The light 310 is incident on the waveplate surface 240. The waveplate surface 240 changes the linear polarized light 310 to circularly polarized light 315. The waveplate surface 240 (quarter-waveplate) has an axis 45 degrees (or multiples of 90 degrees therein) relative to the y direction (which is the direction of polarization of light 310), in the XY plane. The orientation of the waveplate axis relative to the incident linearly polarized light controls the handedness of the circularly polarized light. The waveplate surface 240 changes the polarization of light 310 from linear polarization to circular polarization—shown as light 315. The light 315 is circularly polarized and may have a handedness that is clockwise or anti-clockwise based on the orientation of the axis of the waveplate surface 240 relative to the incident linearly polarized light 310. The light 315 is incident on the mirrored surface 255.

The mirrored surface 255 can transmit a portion of the circularly polarized light 315 as light 320, and the mirrored surface 255 also reflects a portion of the circularly polarized light 315 as light 325. The mirrored surface 255 is configured to reflect 50% of incident light (e.g., the light 315) and transmit the remaining 50% (e.g., as the light 320). In alternate embodiments, the amount of light reflected and the amount of light transmitted by the mirrored surface 255 may differ from one another, specifically if it is a reflective polarizer. In this embodiment, the waveplate surface 260 may be optional as the state of operating the mirrored surface 255 as a reflective polarizer can be accomplished through the use of a combined waveplate and polarizer set.

The transmitted light 320 is incident on the waveplate surface 260. The waveplate surface 260 changes the circularly polarized light 320 to linearly polarized light 322. The linear polarized light 322 is incident on the linear polarizer 225. As the linear polarized light 322 is oriented along a blocking direction of the linear polarizer 225 the light 322 is not transmitted to the exit pupil 245.

Turning back to the circularly polarized light 325 reflected from the mirrored surface 255, the circularly polarized light 325 is converted from circular polarized light to linearly polarized light 330 by the waveplate surface 240.

The linearly polarized light 330 is incident on the reflective polarizer surface 235, which reflects light that is polarized in a blocking direction (e.g., x direction) and transmits light that is polarized in a perpendicular direction (e.g., y direction). At this point, the linearly polarized light 330 is linearly polarized in the blocking direction. Thus, the reflective polarizer surface 235 reflects the linearly polarized light 330 and the reflected light is referred to as linearly polarized light 335. The waveplate surface 240 changes the linearly polarized light 335 to circularly polarized light 340 and the mirrored surface 255 reflects a portion of the circularly polarized light 340 (not shown) and transmits a portion of the circularly polarized light 340 referred to as circularly polarized light 345. As noted above, the amount reflected and/or transmitted may be 50% or some other percentage of the incident light.

The waveplate surface 260 changes the circularly polarized light 345 to linearly polarized light 350 that is polarized in a transmission direction (e.g., x). The linear polarized light 350 is then transmitted as light 355 by the linear polarizer 225 because its polarization aligns with the transmission direction of the linear polarizer 225. The transmitted light 355 is provided to the exit pupil 245.

System Overview

Figure 4:
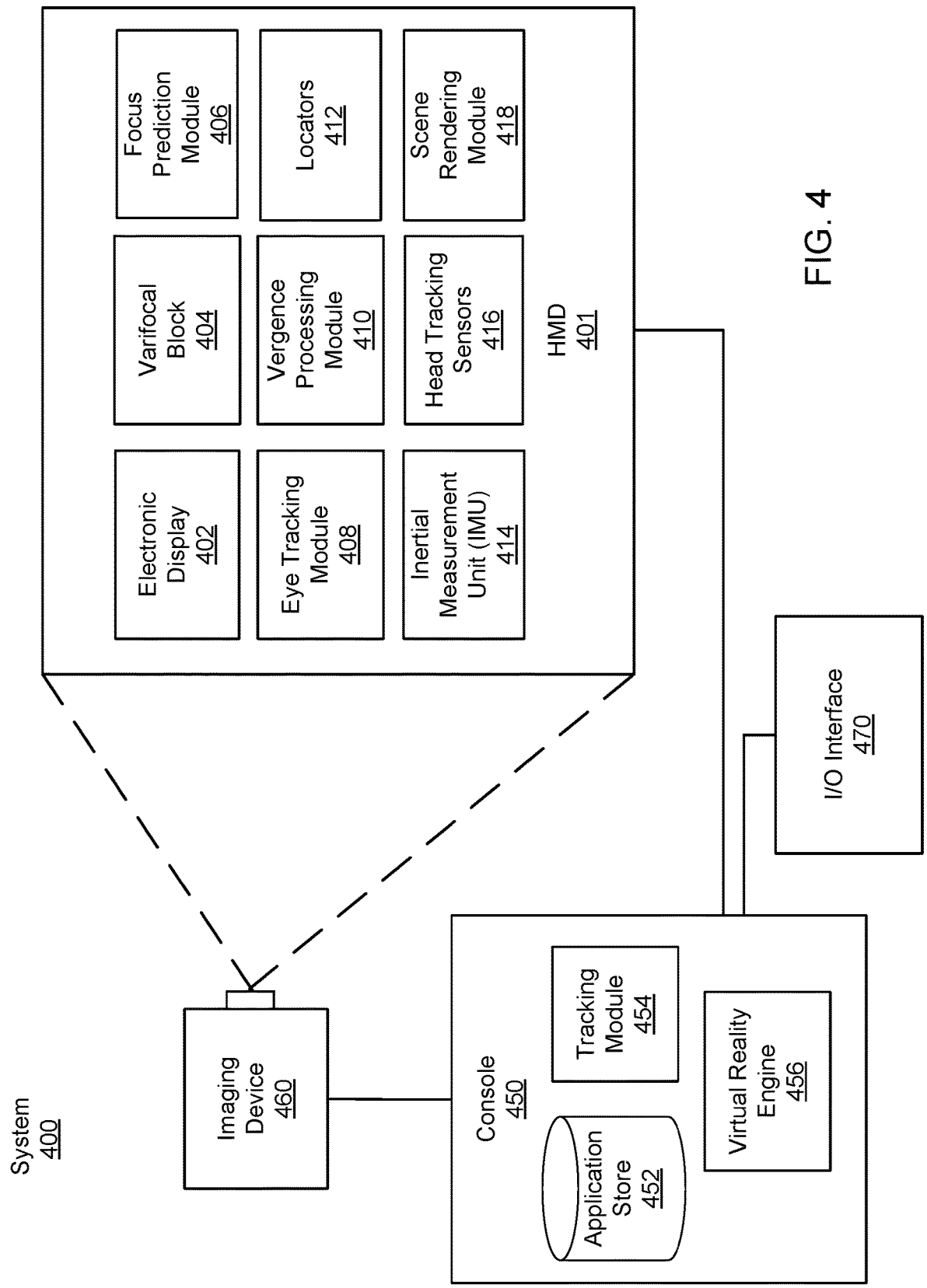
FIG. 4 shows an example varifocal system, in accordance with at least one embodiment.

FIG. 4 shows an example varifocal system 400, in accordance with at least one embodiment. In some embodiments, the varifocal system 400 may operate in a virtual reality (VR) system environment, an augmented reality (AR) system environment, a mixed reality (MR) system environment, or some combination thereof. The varifocal system 400 shown by FIG. 4 comprises an HMD 401 and an input/output (I/O) interface 470 that are communicatively coupled to a console 450. While FIG. 4 shows an example varifocal system 400 including one HMD 401 and an I/O interface 470, in other embodiments, any number of these components may be included in the varifocal system 400. For example, there may be multiple HMDs 401 each having an associated I/O interface 470, with each HMD 401 and I/O interface 470 communicating with the console 450. In alternative configurations, different and/or additional components may be included in the varifocal system 400. Additionally, functionality described in conjunction with one or more of the components shown in FIG. 4 may be distributed among the components in a different manner than described in conjunction with FIG. 4 in some embodiments. For example, some or all of the functionality of the console 450 is provided by the HMD 401.

The HMD 401 is a head-mounted display that presents content to a user. Example content includes images, video, audio, or some combination thereof. Audio content may be presented via a separate device (e.g., speakers and/or headphones) external to the HMD 401 that receives audio information from HMD 401, console 450, or both. The HMD 401 includes an electronic display 402, a varifocal block 404, a focus prediction module 406, an eye tracking module 408, a vergence processing module 408, a plurality of locators 412, an inertial measurement unit (IMU) 414, head tracking sensors 416, and a scene rendering module 418. In some embodiments, the HMD 401 may also or alternatively act as an augmented reality (AR) and/or mixed reality (MR) HMD. In these embodiments, the HMD 401 augments views of a physical, real-world environment with computer-generated elements (e.g., images, video, sound, etc.).

The electronic display 402 presents visual information (i.e., image light) from an electronic signal. The electronic display includes one or more electronic display elements. An electronic display element may be, e.g., a liquid crystal display (LCD), an organic light emitting diode (OLED) display, an active-matrix organic light-emitting diode display (AMOLED), some type of flexible display, or some combination thereof. In some embodiments, the electronic display 402 includes a linear polarizer or admits light that is linearly polarized.

The varifocal block 404 directs light from the electronic display 402 to an exit pupil for viewing by a user. The varifocal block 404 is an embodiment of the varifocal block 205 of FIG. 2. The varifocal block 404 includes two optical elements (e.g., the front optical element 220 and the back optical element 215 as described above with reference to FIG. 2). Magnification of the image light by the varifocal block 404 allows the electronic display 402 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

The varifocal block 404 is configured to change a distance between the two optical elements (e.g., the front optical element 220 and the back optical element 215 as described above with reference to FIG. 2) to keep a user's eyes in a zone of comfort for a particular accommodation of the user's eyes. The varifocal block 404 adjusts the distance between the two optical elements in accordance with varifocal instructions. As discussed above with reference to FIG. 2, the varifocal block 404 adjusts the distance between the two optical elements by either individually or simultaneously moving both optical elements either closer to each other or farther away from each other. The different positions of optical elements within the varifocal block 404 are referred to as states.

Each state of the varifocal block 404 corresponds to a focus position of the HMD 401 or to a combination of the focal length and eye position relative to the varifocal block 404. Any number of states could be provided; however, a limited number of states accommodate the sensitivity of the human eye, allowing some embodiments to include fewer focal states. The varifocal block 404, thus, sets and changes the state of the varifocal block 404 to achieve a desired focal plane.

The focus prediction module 406 is an encoder including logic that tracks the state of the varifocal block 404 to predict to a plurality of future states of the varifocal block 404. For example, the focus prediction module 406 accumulates historical information corresponding to previous states of the varifocal block 404 and predicts a future state of the varifocal block 404 based on the previous states. Because rendering of a virtual scene by the HMD 401 is adjusted based on the state of the varifocal block 404, the predicted state allows the scene rendering module 418, further described below, to determine an adjustment to apply to the virtual scene for a particular frame. Accordingly, the focus prediction module 406 communicates information describing a predicted state of the varifocal block 404 for a frame to the scene rendering module 418. Adjustments for the different states of the varifocal block 404 performed by the scene rendering module 418 are further described below.

The eye tracking module 408 tracks an eye position and eye movement of a user of HMD 401. A camera or other optical sensor inside the HMD 401 captures information of a user's eyes, and the eye tracking module 408 uses the captured information to determine interpupillary distance, interocular distance, a three-dimensional (3D) position of each eye relative to the HMD 401 (e.g., for distortion adjustment purposes), including a magnitude of torsion and rotation (i.e., roll, pitch, and yaw) and gaze directions for each eye. In one example, infrared light is emitted within the HMD 401 and reflected from each eye. The reflected light is received or detected by the camera and analyzed to extract eye rotation from changes in the infrared light reflected by each eye. Many methods for tracking the eyes of a user can be used by the eye-tracking module 408. Accordingly, the eye tracking module 408 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 408 integrates information from past measurements, measurements identifying a position of a user's head, and 3D information describing a scene presented by the electronic display 402. Thus, information for the position and orientation of the user's eyes is used to determine the gaze point in a virtual scene presented by the HMD 401 where the user is looking.

The vergence processing module 410 determines a vergence depth of a user's gaze based on the gaze point or an estimated intersection of the gaze lines determined by the eye tracking module 408. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 410 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 412 are objects located in specific positions on the HMD 401 relative to one another and relative to a specific reference point on the varifocal system 400. Locators 412 may be a light emitting diode (LED), a corner cube reflector, a reflective marker, a type of light source that contrasts with an environment in which the HMD 401 operates, or some combination thereof. Active locators 412 (i.e., an LED or other type of light emitting device) may emit light in the visible band (~380 nm to 750 nm), in the infrared (IR) band (~750 nm to 2,000 nm), in the ultraviolet band (150 nm to 380 nm), some other portion of the electromagnetic spectrum, or some combination thereof.

The locators 412 can be located beneath an outer surface of the varifocal system 400, which is transparent to the wavelengths of light emitted or reflected by locators 412 or is thin enough not to substantially attenuate the wavelengths of light emitted or reflected by the locators 412. Further, the outer surface or other portions of the HMD 401 can be opaque in the visible band of wavelengths of light. Thus, the locators 412 may emit light in the IR band while under an outer surface of the HMD 401 that is transparent in the IR band but opaque in the visible band.

The IMU 414 is an electronic device that generates fast calibration data based on measurement signals received from a plurality of head tracking sensors 416, which generate a plurality of measurement signals in response to motion of the HMD 401. Examples of head tracking sensors 416 include accelerometers, gyroscopes, magnetometers, other sensors suitable for detecting motion, correcting error associated with the IMU 414, or some combination thereof. Head tracking sensors 416 may be located external to the IMU 414, internal to the IMU 414, or some combination thereof.

Based on the measurement signals from head tracking sensors 416, the IMU 414 generates fast calibration data indicating an estimated position of the HMD 401 relative to an initial position of the HMD 401. For example, the head tracking sensors 416 include multiple accelerometers to measure translational motion (forward/back, up/down, left/right) and multiple gyroscopes to measure rotational motion (e.g., pitch, yaw, and roll). IMU 414 can, for example, rapidly sample the measurement signals and calculate the estimated position of the HMD 401 from the sampled data. For example, the IMU 414 integrates measurement signals received from the accelerometers over time to estimate a velocity vector and integrates the velocity vector over time to determine an estimated position of a reference point on the HMD 401. The reference point is a point that may be used to describe the position of the HMD 401. While the reference point may generally be defined as a point in space, in various embodiments, reference point is defined as a point within the HMD 401 (e.g., a center of the IMU 414). Alternatively, the IMU 414 provides the sampled measurement signals to the console 450, which determines the fast calibration data.

The IMU 414 can additionally receive a plurality of calibration parameters from the console 450. As further discussed below, the plurality of calibration parameters are used to maintain tracking of the HMD 401. Based on a received calibration parameter, the IMU 414 may adjust a plurality of IMU parameters (e.g., sample rate). In some embodiments, certain calibration parameters cause the IMU 414 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 418 receives content for the virtual scene from a VR engine 456 and provides the content for display on the electronic display 402. Additionally, the scene rendering module 418 can adjust the content based on information from the focus prediction module 406, the vergence processing module 410, the IMU 414, and the head tracking sensors 416. For example, upon receiving the content from the VR engine 456, the scene rendering module 418 adjusts the content based on the predicted state (i.e., eye position and focal length) of the varifocal block 404 received from the focus prediction module 406. Additionally, the scene rendering module 418 determines a portion of the content to be displayed on the electronic display 402 based on a plurality of the tracking module 454, the head tracking sensors 416, or the IMU 414, as described further below.

The imaging device 460 generates slow calibration data in accordance with calibration parameters received from the console 450. Slow calibration data includes a plurality of images showing observed positions of the locators 412 that are detectable by the imaging device 460. The imaging device 460 may include a plurality of cameras, a plurality of video cameras, other devices capable of capturing images including a plurality of locators 412, or some combination thereof. Additionally, the imaging device 460 may include a plurality of filters (e.g., for increasing signal to noise ratio). The imaging device 460 is configured to detect light emitted or reflected from the locators 412 in a field of view of the imaging device 460. In embodiments where the locators 412 include passive elements (e.g., a retroreflector), the imaging device 460 may include a light source that illuminates some or all of the locators 412, which retro-reflect the light towards the light source in the imaging device 460. Slow calibration data is communicated from the imaging device 460 to the console 450, and the imaging device 460 receives a plurality of calibration parameters from the console 450 to adjust a plurality of imaging parameters (e.g., focal length, focus, frame rate, ISO, sensor temperature, shutter speed, aperture, etc.).

The I/O interface 470 is a device that allows a user to send action requests to the console 450. An action request is a request to perform a particular action. For example, an action request may be to start or end an application or to perform a particular action within the application. The I/O interface 470 may include a plurality of input devices. Example input devices include a keyboard, a mouse, a game controller, or any other suitable device for receiving action requests and communicating the received action requests to the console 450. An action request received by the I/O interface 470 is communicated to the console 450, which performs an action corresponding to the action request. In some embodiments, the I/O interface 470 may provide haptic feedback to the user in accordance with instructions received from the console 450. For example, haptic feedback is provided by the I/O interface 470 when an action request is received, or the console 450 communicates instructions to the I/O interface 470 causing the I/O interface 470 to generate haptic feedback when the console 450 performs an action.

The console 450 provides content to the HMD 401 for presentation to the user in accordance with information received from the imaging device 460, the HMD 401, or the I/O interface 470. In the example shown in FIG. 4, the console 450 includes an application store 452, a tracking module 454, and a virtual reality (VR) engine 456. Some embodiments of the console 450 have different or additional modules than those described in conjunction with FIG. 4. Similarly, the functions further described below may be distributed among components of the console 450 in a different manner than is described here.

The application store 452 stores a plurality of applications for execution by the console 450. An application is a group of instructions, that when executed by a processor, generates content for presentation to the user. Content generated by an application may be in response to inputs received from the user via movement of the HMD 401 or the I/O interface 470. Examples of applications include gaming applications, conferencing applications, video playback application, or other suitable applications.

The tracking module 454 calibrates the varifocal system 400 using a plurality of calibration parameters and may adjust a plurality of calibration parameters to reduce error in determining position of the HMD 401. For example, the tracking module 454 adjusts the focus of the imaging device 460 to obtain a more accurate position for the observed locators 412 on the HMD 401. Moreover, calibration performed by the tracking module 454 also accounts for information received from the IMU 414. Additionally, if tracking of the HMD 401 is lost (e.g., imaging device 460 loses line of sight of at least a threshold number of locators 412), the tracking module 454 re-calibrates some or all of the VR system components.

Additionally, the tracking module 454 tracks the movement of the HMD 401 using slow calibration information from the imaging device 460 and determines positions of a reference point on the HMD 401 using observed locators from the slow calibration information and a model of the HMD 401. The tracking module 454 also determines positions of the reference point on the HMD 401 using position information from the fast calibration information from the IMU 414 on the HMD 401. Additionally, the tracking module 454 may use portions of the fast calibration information, the slow calibration information, or some combination thereof, to predict a future location of the HMD 401, which is provided to a VR engine 456.

The VR engine 456 executes applications within the varifocal system 400 and receives position information, acceleration information, velocity information, predicted future positions, or some combination thereof for the HMD 401 from the tracking module 454. Based on the received information, the VR engine 456 determines content to provide to the HMD 401 for presentation to the user, such as a virtual scene, one or more virtual objects to overlay onto a real world scene, etc.

The VR engine 456 maintains focal capability information of the varifocal block 404. Focal capability information is information that describes what focal distances are available to the varifocal block 404 (e.g., what states are available). Focal capability information may include, e.g., a range of focus the varifocal block 404 is able to accommodate (e.g., 0 to 4 diopters), The VR engine 456 generates varifocal instructions for the varifocal block 404, the varifocal instructions cause the varifocal block 404 to adjust its focal distance to a particular location. The VR engine 456 generates the varifocal instructions based on focal capability information, information from the focus prediction module 406, the vergence processing module 410, the IMU 414, and the head tracking sensors 416, or some combination thereof. The VR engine 456 provides the instructions to the varifocal block 404.

Additionally, the VR engine 456 performs an action within an application executing on the console 450 in response to an action request received from the I/O interface 470 and provides feedback to the user that the action was performed. The provided feedback may be visual or audible feedback via the HMD 401 or haptic feedback via the I/O interface 470.

Figure 5A:
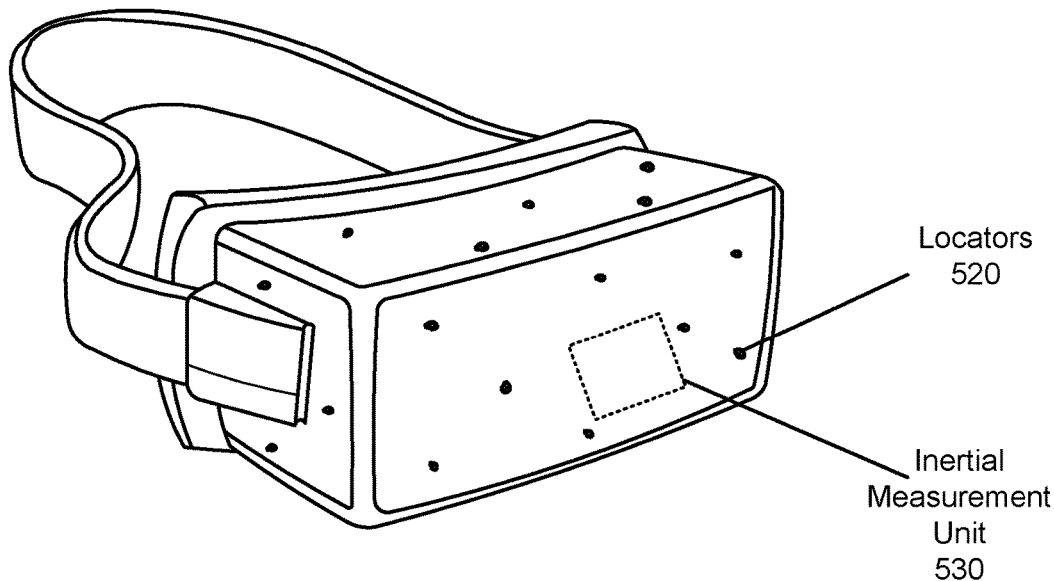
FIG. 5A is a diagram of a HMD, in accordance with at least one embodiment.

FIG. 5A is a diagram of a HMD 401, in accordance with an embodiment. The HMD 401 is an embodiment of the HMD 401 of FIG. 4. The HMD 401 includes electronic display elements (not shown in FIG. 5A), a plurality of locators 520, and an IMU 530. The locators 520 is an embodiment of the locators 412 of FIG. 4. The IMU 530 is an embodiment of the IMU 414 of FIG. 4. In embodiments, where the HMD 401 operates as in an AR or MR environment, portions of the HMD 401 are at least partially transparent to light in the visible band, such that light external to the HMD 401 may be combined with displayed light and presented to the user.

Figure 5B:
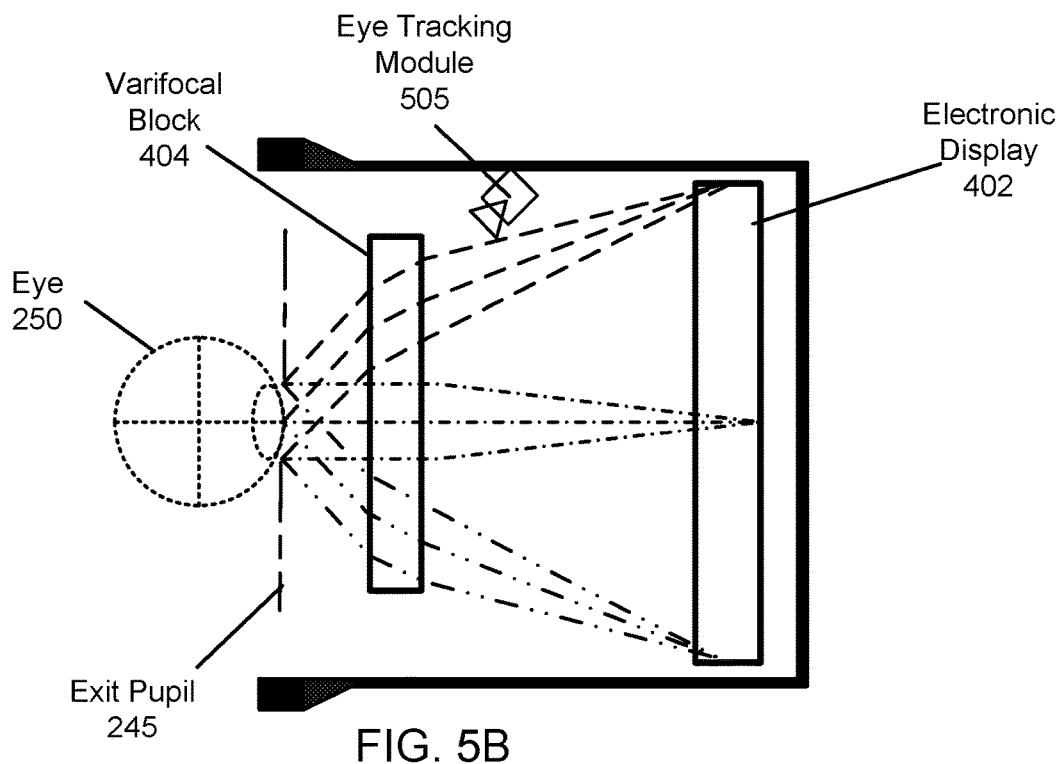
FIG. 5B is a cross section of a front rigid body of the HMD in FIG. 5A, in accordance with an embodiment.

FIG. 5B is a cross section of the HMD 401 shown in FIG. 5A. As shown in FIG. 5B, the HMD 401 includes display elements that provide focus adjusted image light to an exit pupil 245. The cross-section of the HMD 401 includes the varifocal block 404, an eye tracking module 505, and the electronic display 402. For purposes of illustration, FIG. 5B shows a cross section of the HMD 401 associated with a single eye 250, but another varifocal block, separate from the varifocal block 404, provide altered image light to another eye of the user. The eye tracking module 505 is an embodiment of the eye tracking module 408 of FIG. 4.

The varifocal block 404 includes at least two optical elements that move relative to each other as described above with regard to FIGS. 2 and 4. Magnification of the image light by the varifocal block 404 allows elements of the electronic display 402 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the varifocal block 404 is designed so its effective focal length is larger than the spacing to the electronic display 402, which magnifies the image light projected by the electronic display 402. Additionally, in some embodiments, the amount of magnification may be adjusted by adding or removing optical elements.

Focus Adjustment Method

Figure 6:
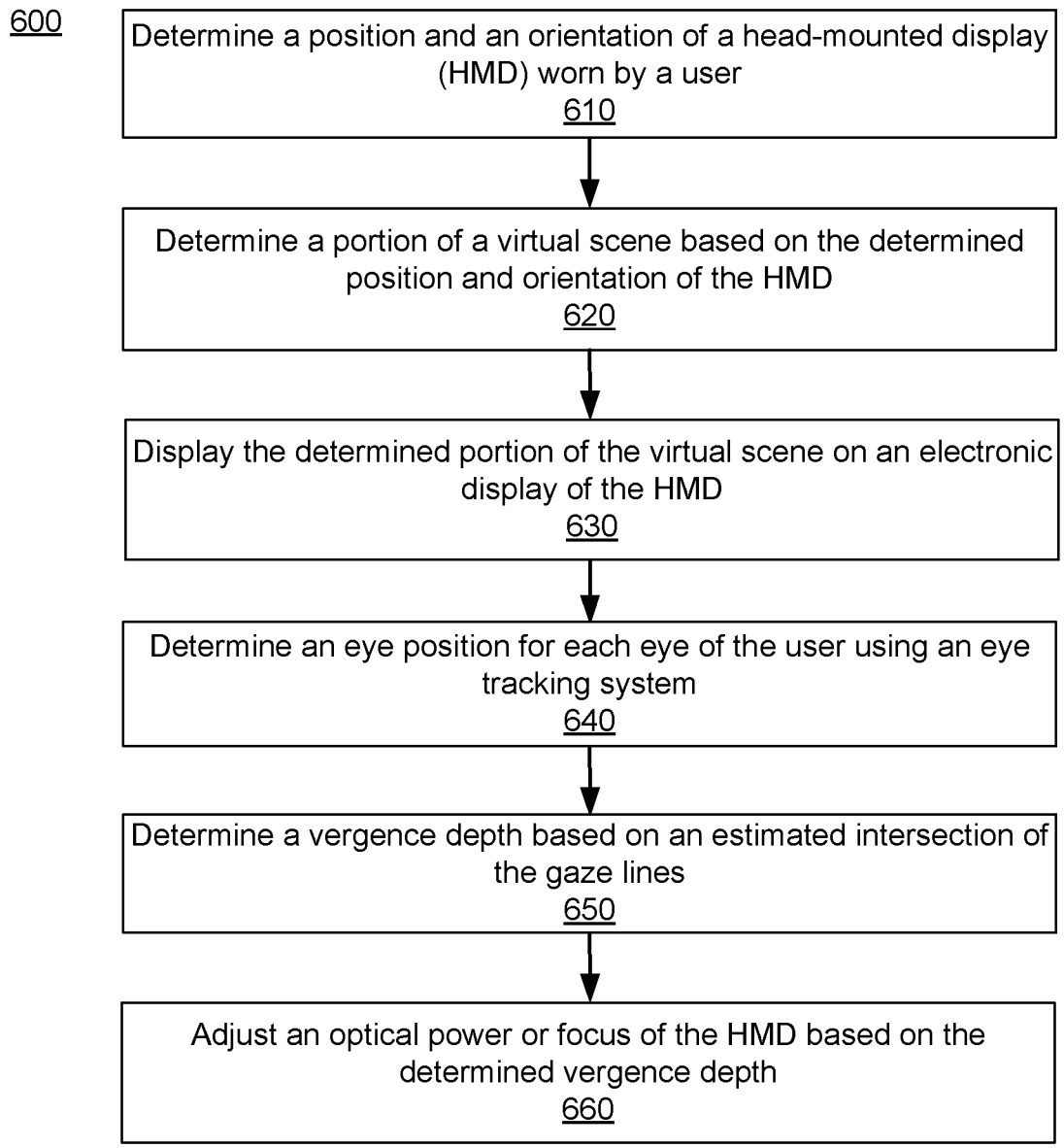
FIG. 6 shows an example process for mitigating vergence-accommodation conflict, in accordance with at least one embodiment.

FIG. 6 is a process 600 for mitigating vergence-accommodation conflict by adjusting the focal length of an HMD 401, according to an embodiment. The process 600 may be performed by the varifocal system 400 in some embodiments. Alternatively, other components may perform some or all of the steps of the process 600. For example, in some embodiments, a HMD 401 and/or a console (e.g., console 450) may perform some of the steps of the process 600. Additionally, the process 600 may include different or additional steps than those described in conjunction with FIG. 6 in some embodiments or perform steps in different orders than the order described in conjunction with FIG. 6.

As discussed above, a varifocal system 400 may dynamically vary its focus to bring images presented to a user wearing the HMD 200 into focus, which keeps the user's eyes in a zone of comfort as vergence and accommodation change. Additionally, eye tracking in combination with the variable focus of the varifocal system allows blurring to be introduced as depth cues in images presented by the HMD 401.

The varifocal system 400 determines 610 a position, an orientation, and/or a movement of HMD 401. The position is determined by a combination of the locators 412, the IMU 414, the head tracking sensors 416, the imagining device 460, and the tracking module 454, as described above in conjunction with FIG. 4.

The varifocal system 400 determines 620 a portion of a virtual scene based on the determined position and orientation of the HMD 401. The varifocal system 400 maps a virtual scene presented by the HMD 401 to various positions and orientations of the HMD 401. Thus, a portion of the virtual scene currently viewed by the user is determined based on the position, orientation, and movement of the HMD 401.

The varifocal system 400 displays 630 the determined portion of the virtual scene being on an electronic display (e.g., the electronic display 402) of the HMD 401. In some embodiments, the portion is displayed with a distortion correction to correct for optical error that may be caused by the image light passing through the varifocal block 404. Further, the varifocal block 404 has adjusted a distance between two optical elements (e.g., a front and a back optical element as described above with regard to FIG. 2), to provide focus and accommodation to the location in the portion of the virtual scene where the user's eyes are verged.

The varifocal system 400 determines 640 an eye position for each eye of the user using an eye tracking system. The varifocal system 400 determines a location or an object within the determined portion at which the user is looking to adjust focus for that location or object accordingly. To determine the location or object within the determined portion of the virtual scene at which the user is looking, the HMD 401 tracks the position and location of the user's eyes using image information from an eye tracking system (e.g., eye tracking module 408). For example, the HMD 401 tracks at least a subset of a 3D position, roll, pitch, and yaw of each eye and uses these quantities to estimate a 3D gaze point of each eye.

Figure 7:
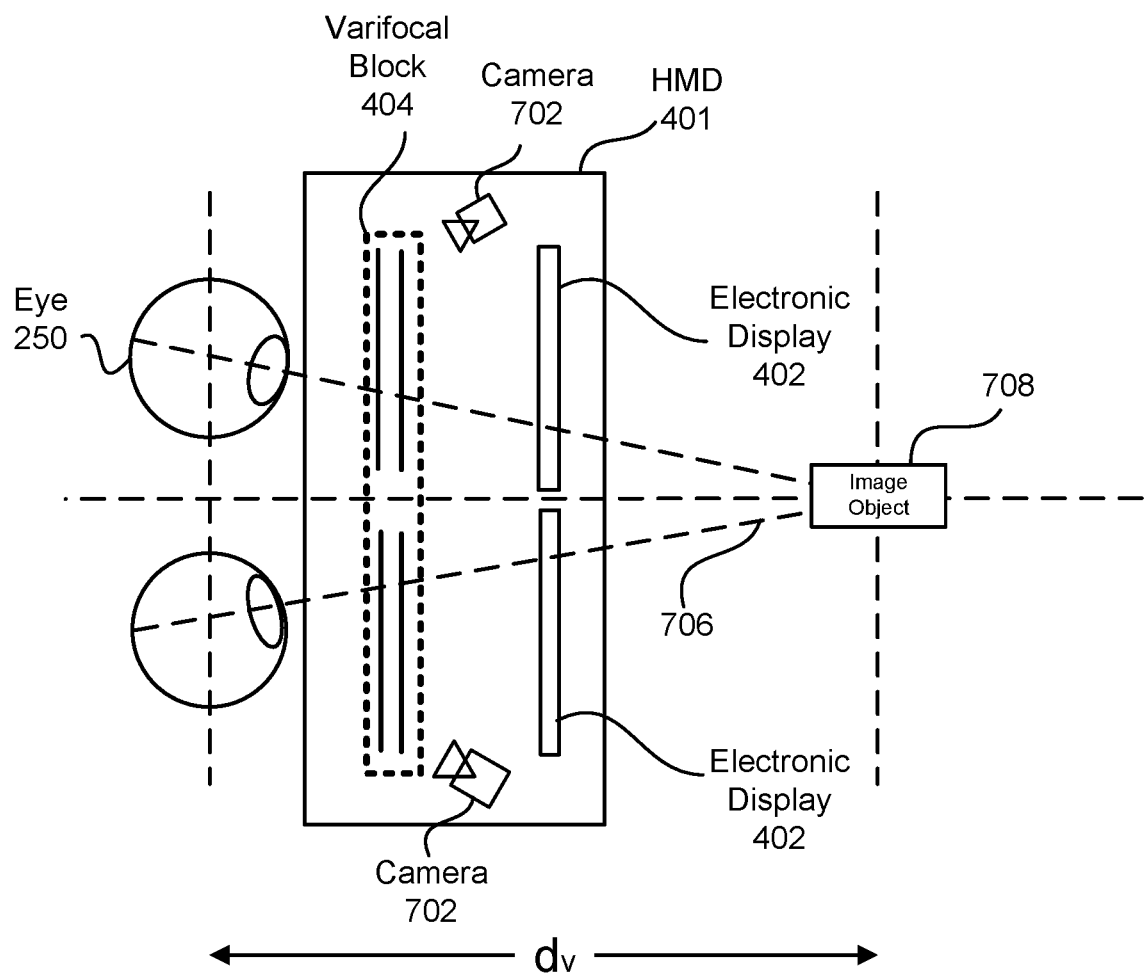
FIG. 7 shows a cross section of an HMD configured to mitigate vergence-accommodation conflict, in accordance with an embodiment.

The varifocal system 400 determines 650 a vergence depth based on an estimated intersection of gaze lines. For example, FIG. 7 shows a cross section of an embodiment of the HMD 401 that includes camera 702 for tracking a position of each eye 250, the electronic display 402, and the varifocal block 404 as described with respect to, e.g., FIGS. 2-4. In this example, the camera 702 captures images of the user's eyes looking at an image object 708 and the eye tracking module 408 determines an output for each eye 250 and gaze lines 706 corresponding to the gaze point or location where the user is looking based on the captured images. Accordingly, a vergence depth ($d_v$) of the image object 708 (also the user's gaze point) is determined 650 based on an estimated intersection of the gaze lines 706. As shown in FIG. 7, the gaze lines 706 converge or intersect at distance dam, where the image object 708 is located. In some embodiments, information from past eye positions, information describing a position of the user's head, and information describing a scene presented to the user may also be used to estimate the 3D gaze point of an eye in various embodiments.

Accordingly, referring again to FIG. 6, the varifocal system 400 adjusts 660 an optical power of the HMD 401 based on the determined vergence depth. The varifocal system 400 sets a focal plane to the determined vergence depth by controlling a distance between a front optical element and a back optical element in the varifocal block 404. As noted above, the varifocal system 400 is able to rapidly adjust the focal plane location as it simultaneously adjusts the positions of the front optical element and the back optical element relative to each other. As described above, the optical power of the varifocal block 404 is adjusted to change a focal distance of the HMD 401 to provide accommodation for the determined vergence depth corresponding to where or what in the displayed portion of the virtual scene the user is looking.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted-display (HMD) comprising:
   an electronic display configured to emit image light; and
   a varifocal block configured to receive the image light and output the image light in at least one of a plurality of focal planes of the varifocal block, the varifocal block comprising:
      a back optical element positioned to receive the image light from the electronic display,
      a front optical element, the front optical element is positioned to receive the image light from the back optical element and is closer to an exit pupil of the HMD than the back optical element, and the front optical element is separated from the back optical element by an adjustable distance, the magnitude of the adjustable distance determines in which of the plurality of focal planes the image light exiting the front optical element is presented; and
      an actuator assembly coupled to the back and front optical element, the actuator assembly configured to, in accordance with an estimated vergence depth of a user of the HMD, simultaneously and individually adjust positions of the back optical element and the front optical element either closer to each other or farther away from each other in order to vary the adjustable distance between the back optical element and the front optical element, wherein a rate of adjustment for the back optical element is the same as, but in an opposite direction of, a rate of adjustment for the front optical element.

2. The HMD of claim 1, further comprising:
   an eye tracking module configured to track eye position of one or both eyes of a user wearing the HMD to determine at least one of an interpupillary distance, an interocular distance, a three-dimensional (3D) position of each eye relative to the HMD and gaze directions for each eye of the user.

3. The HMD of claim 1, wherein the back optical element further comprises:
   a reflective polarizer surface configured to reflect linearly polarized light having a first polarization, and transmit linearly polarized light having a second polarization that is orthogonal to the first polarization; and
   a waveplate surface configured to shift a polarization state of light received from the reflective polarizer surface.

4. The HMD of claim 3, wherein the waveplate surface is a quarter waveplate.

5. The HMD of claim 1, wherein the front optical element further comprises:
   a mirrored surface configured to reflect light of a first polarization and transmit light of a second polarization that is orthogonal to the first polarization; and
   a waveplate surface configured to shift a polarization state of light received from the mirrored surface.

6. The HMD of claim 5, wherein the waveplate surface is a quarter waveplate.

7. The HMD of claim 1, wherein the front optical element and the back optical element each include a plurality of surfaces, and each of the plurality of surfaces have a shape selected from a group consisting of: spherically concave, spherically convex, a rotationally symmetric sphere, and a freeform shape.

8. The HMD of claim 1, wherein the front optical element and the back optical element are coupled to a screw, and a rotation of the screw causes a simultaneous change in the adjustable distance between the front optical element and the back optical element.

9. The HMD of claim 1, wherein the actuator assembly comprises one or more motors configured to perform a movement of at least one of the front optical element and the back optical element to vary the adjustable distance between the back optical element and the front optical element.

10. A varifocal block configured to receive image light from an electronic display and output the image light in at least one of a plurality of focal planes of the varifocal block, the varifocal block comprising:
   a back optical element positioned to receive image light from the electronic display,
   a front optical element, the front optical element is positioned to receive the image light from the back optical element and is closer to an exit pupil than the back optical element, and the front optical element is separated from the back optical element by an adjustable distance, the magnitude of the adjustable distance determines in which of the plurality of focal planes the image light exiting the front optical element is presented; and
   an actuator assembly coupled to the back and front optical element, the actuator assembly configured to, in accordance with an estimated vergence depth of a user, simultaneously and individually adjust positions of the back optical element and the front optical element either closer to each other or farther away from each other in order to vary the adjustable distance between the back optical element and the front optical element, wherein a rate of adjustment for the back optical element is the same as, but in an opposite direction of, a rate of adjustment for the front optical element.

* * * * *